Figure 1:
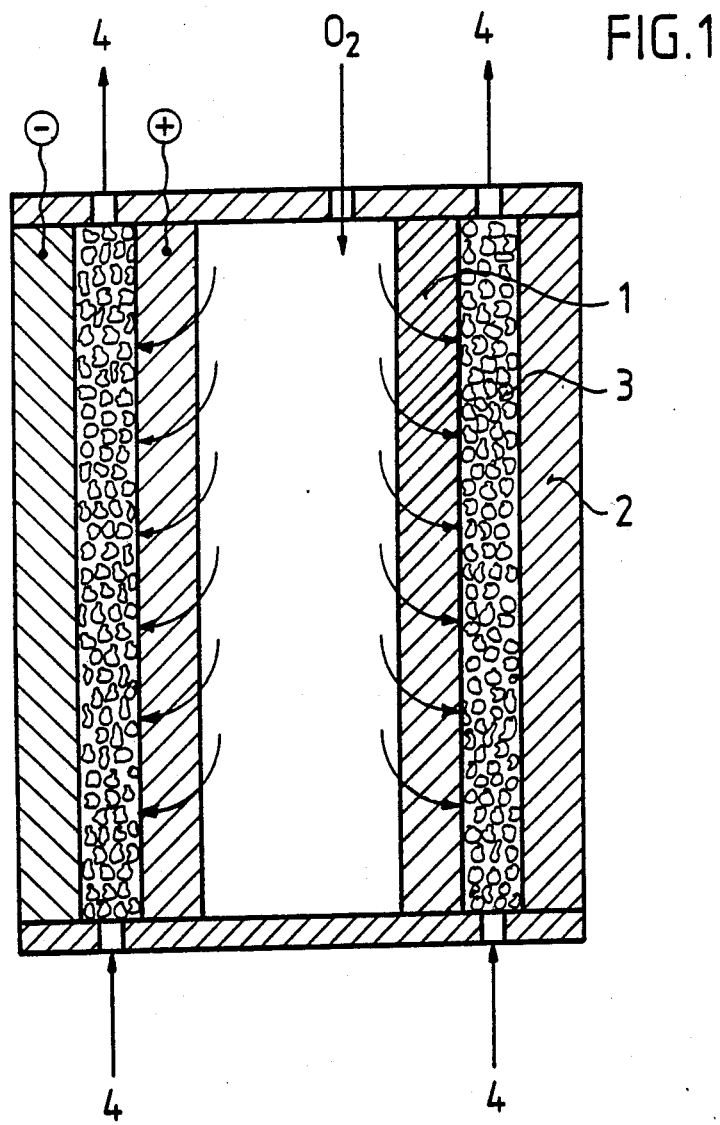

United States Patent

Habermann et al.

[11] Patent Number: 4,670,360
[45] Date of Patent: Jun. 2, 1987

[54] FUEL CELL

[75] Inventors: Wolfgang Habermann, Mainz; Ernst-Heinrich Pommer, Limburgerhof; Peter Hammes, Ruppertsberg; Hubert Engelhardt, Ludwigshafen; Wolfgang Geiger, Plankstadt; Werner Simmler, Ludwigshafen; Guenther Huber, Dannstadt-Schauernheim, all of Fed. Rep. of Germany

[73] Assignee: BASF Aktiengesellschaft, Ludwigshafen, Fed. Rep. of Germany

[21] Appl. No.: 764,327

[22] Filed: Aug. 12, 1985

[30] Foreign Application Priority Data

Aug. 18, 1984 [DE] Fed. Rep. of Germany ....... 3430485

[51] Int. Cl.$^4$ ............................................. H01M 4/96
[52] U.S. Cl. ..................... 429/33; 204/35.1; 204/37.6; 204/38.3; 204/149; 204/277; 204/294; 204/302; 429/44
[58] Field of Search ............... 204/302, 304, 305, 306, 204/307, 308, 149, 263, 265, 260, 272, 275, 277, 290 R, 294, 35.1, 37.6, 38.3, 56 R; 429/41, 43, 44, 45, 33; 210/748

[56] References Cited

U.S. PATENT DOCUMENTS

| | | | |
|---|---|---|---|
| 3,619,296 | 11/1971 | Niedrach | 429/44 X |
| 3,915,822 | 10/1975 | Veltman | 204/151 |
| 4,202,934 | 5/1980 | Jalan | 429/40 |
| 4,242,421 | 12/1980 | Kudo et al. | 429/13 |
| 4,445,990 | 5/1984 | Kim et al. | 204/151 |
| 4,447,505 | 5/1984 | Blanchart | 429/42 |
| 4,472,257 | 9/1984 | Sklyarov | 204/290 R |

OTHER PUBLICATIONS

The Condensed Chemical Dictionary, seventh edition, Reinhold Book Corp., New York, 1966, p. 433.
Webster's Seventh New Collegiate Dictionary, G. & C. Merriam Co., Springfield, Mass., 1967, p. 337.

Primary Examiner—John F. Niebling
Assistant Examiner—William T. Leader
Attorney, Agent, or Firm—Keil & Weinkauf

[57] ABSTRACT

In a fuel cell which has an activated carbon-containing anode and an activated carbon-containing cathode and is preferably used for the oxidative treatment of waste waters containing oxygen or oxygen-containing compounds, the cathode has been subjected to partial anodic oxidation in a mineral acid at a potential $\epsilon_h$ of from +1.3 to +10V and then doped with molybdenum(VI) and/or tungsten(VI) and/or vanadium(V) compounds, and the anode has been subjected to partial anodic oxidation in an aqueous mineral acid, cathodically reduced in an aqueous mineral acid and then impregnated with cobalt hydroxide and/or nickel hydroxide and/or copper hydroxide and/or zinc hydroxide, the anode and the cathode being separated by a porous polyelectrolyte through which the waste water flows.

6 Claims, 2 Drawing Figures

FUEL CELL

The present invention relates to a fuel cell which has an activated carbon-containing anode and an activated carbon-containing cathode and is preferably used for the oxidative treatment of waste waters containing oxygen or oxygen-containing compounds.

In industry, the oxidative treatment of waste water is carried out using not only biological methods but also chemical or electrochemical oxidation processes. In biological activated sludge plants, substantial degradation of harmful substances can be effected only with inadequate space-time yields. For example, humic acids, fulvic acids, aromatics and chlorohydrocarbons are scarcely degraded by this technique. Better space-time yields are obtained with processes in which air or oxygen is used in combination with activated carbons. The degree of degradation corresponds to that of the biological activated sludge plants. Virtually complete degradation is achieved by means of chemical processes in which ozone or hydrogen peroxide is used as the oxidizing agent. The high costs and the production of small amounts of chlorohydrocarbons as by-products of the oxidation are disadvantages of this technique. Electrochemical oxidation by electrolysis has the same advantages and disadvantages.

It is an object of the present invention to provide a process which makes it possible to submit harmful substances in waste water to oxidative degradation in a manner which causes little pollution and is economical.

We have found that this object is achieved, in accordance with the invention, by a fuel cell of the type stated at the outset in which the cathode has been subjected to partial anodic oxidation in an aqueous mineral acid at a potential $\epsilon_h$ of from $+1.3$ to $+10$ V and then doped with molybdenum(VI) and/or tungsten(VI) and/or vanadium(V) compounds, and the anode has been subjected to partial anodic oxidation in an aqueous mineral acid, cathodically reduced in an aqueous mineral acid and then impregnated with cobalt hydroxide and/or nickel hydroxide and/or copper hydroxide and/or zinc hydroxide, the anode and cathode being separated by a porous polyelectrolyte through which the waste water flows.

The subclaims relate to further features of the invention.

Examples of suitable carbon-containing materials for the electrodes are graphite and active carbon.

The anodic oxidation of the carbon carrier is carried out, for the cathode and the anode, in an aqueous mineral acid, e.g. nitric acid, phosphoric acid, sulfuric acid or perchloric acid, at a potential $\epsilon_h$ of from $+1.3$ to $+10$ V, preferably from $+1.8$ to $+2.5$ V.

2–80, preferably 30–65, % strength by weight aqueous nitric acid is particularly suitable. The anodic oxidation is effected at from $-2°$ C. to $+100°$ C., preferably from $+10°$ to $+50°$ C., and at a current density of from 0.1 to 10 kA/m$^2$. In the anodic oxidation, the most advantageous current density is from 0.5 to 4 kA/m$^2$ of outer surface area of the carbon.

The oxidation time can be from 2 seconds to 2 hours, preferably from 5 to 30 minutes. The amount of oxygen bound to the carbon surface should be about 30 atom per cent after the anodic oxidation.

Doping and impregnation of the partially oxidized cathode material are carried out using dissolved or finely dispersed compounds of molybdenum, tungsten or vanadium.

Examples of suitable molybdenum compounds are ammonium dimolybdate, ammonium heptamolybdate, ammonium decamolybdate, sodium molybdate, potassium molybdate, molybdenum tetrachloride and molybdenum oxytetrachloride, examples of suitable tungsten compounds are sodium tungstate, potassium tungstate, tungsten hexachloride and tungsten oxytetrachloride, and examples of suitable vanadium compounds are sodium vanadate, potassium vanadate, alkali metal divanadates and tetravanadates, sodium ammonium vanadate and vanadium oxytrichloride.

Preferably, alkali metal molybdates are used for doping the partially oxidized cathode material. When vanadium compounds are used, care must be taken to ensure good fixing on the partially oxidized carbon carrier surface so that no vanadium passes into the waste water. Hence, vanadium compounds are preferably fixed in combination with tungsten or molybdenum(VI) compounds and/or by conversion to iron titanium or zirconium vanadates.

To carry out doping, the molybdenum, tungsten or vanadium compounds and other additives are dissolved or dispersed in water, an alcohol, e.g. methanol or ethanol, an ether, e.g. methyl ethyl ether, or a chlorohydrocarbon, e.g. chloroform or carbon tetrachloride.

Water is preferably used as the solvent. The concentration of the tungsten, molybdenum or vanadium compounds in the solvent can be from 0.01% by weight to saturation limit, preferably from 0.3 to 5% by weight.

After impregnation with the dopants, fixing can be promoted by drying the carbon carrier, halides being dehydrolyzed beforehand. The actual fixing is effected with a dilute aqueous mineral acid or an acidic alkali metal salt. This is preferably done using from 0.1 to 4% strength by weight aqueous nitric acid or sulfuric acid. Good fixing is achieved if fixing is carried out at from $+15°$ to $+30°$ C. during a residence time of from 0.1 to 3 hours.

Fixing can be followed by additional doping and partial reduction of the molybdenum(VI), tungsten(VI) and vanadium(V) compounds with sulfide or hydrogen sulfide. Aqueous ammonium sulfide or alkali metal sulfide solutions, e.g. sodium sulfide or potassium sulfide, are preferably used for this purpose. The concentration of these solutions can be from 0.1 to 10, preferably from 1 to 6, % by weight of alkali metal sulfide. To carry out doping, the catalyst material is immersed for a few minutes, preferably from 1 to 8 minutes, in the alkali metal sulfide solution, separated off and then freed from excess sulfide with a dilute aqueous mineral acid.

Instead of using sulfides, partial reduction may also be effected using other reducing agents, e.g. hydrazine hydrate, hydroxylamine, hydroquinone or hydrogen, or by means of cathodic reduction.

Particularly suitable activation and fixing following the anodic oxidation of the carbon carrier has proved to be doping by means of molybdenum(VI) or vanadium(V) compounds and with titanium(III) or titanium(IV) compounds and/or with iodine(VII) and/or with iodine(V) and/or with tellurium(VI) compounds. In this activation, the atomic ratio of molybdenum or vanadium to titanium should be 2:1, that of molybdenum or vanadium to iodine should be 1:1 and that of molybdenum or vanadium to tellurium should be 6:1. Where mixtures are used, the amounts should be adapted to the ratios.

Preferably used titanium compounds are titanium trichloride and titanyl sulfate. Iodine is preferably used in the form of the alkali metal iodates, or tellurium is preferably employed in the form of alkali metal tellurites.

Instead of tellurium compounds, it is also possible to use selenium compounds. For toxicological reasons, however, the use of these compounds is avoided in most cases.

Oxygen or air is preferably used as the oxidizing agent for the cathode. In special cases, however, it is also possible to use other oxidizing agents, e.g. hydrogen peroxide, peroxydisulfates, perborates, chlorates, chlorites, chlorine dioxide, ozone, nitric acid, nitrous gases, nitrogen dioxide, iron(III) salts, iron(III) salt/hydrogen peroxide mixtures, nitric acid/hydrogen peroxide mixtures or nitric acid/hydrogen peroxide/iron(III) salt mixtures. When these oxidizing agents are used, the cathode must be polarized to a potential $\epsilon_h$ of $< +1.34$ V in order to avoid the formation of chlorohydrocarbons.

In producing the anodes, the carbon carriers anodically oxidized in the nitric acid are first subjected to cathodic reduction in an aqueous mineral acid in order to remove residual oxidizing agent from the pores. Examples of suitable mineral acids are aqueous sulfuric acid, phosphoric acid and hydrochloric acid, 5–20% strength by weight aqueous sulfuric acid preferably being used. The cathodic reduction is preferably carried out at a current density of from 0.2 to 2 kA/m$^2$ and at from 10 to $+50°$ C. The reduction time can be from 10 minutes to 2 hours, preferably from 15 to 30 minutes.

Instead of cathodic reduction, it is also possible to carry out chemical reduction with a reducing agent, e.g. nitrogen, hydrazine hydrate, hydroxylamine or hydroquinone.

The carbon carriers pretreated in this manner are doped using dissolved or finely dispersed compounds of cobalt, nickel, copper or zinc, which are subsequently converted to the hydroxides with alkaline precipitating agents.

Examples of suitable cobalt compounds are cobalt(II) sulfate, cobalt(II) nitrate and cobalt(II) chloride, examples of suitable nickel compounds are nickel(II) chloride, nickel(II) sulfate, nickel(II) nitrate and nickel ammonium sulfate, examples of suitable copper compounds are copper(II) halides, copper(II) ammonium chloride, copper(II) nitrate and copper(II) sulfate, and examples of suitable zinc compounds are zinc(II) halides, zinc(II) ammonium chloride, zinc(II) nitrate, zinc ammonium sulfate and zinc sulfate.

Cobalt hydroxide, nickel hydroxide or a nickel hydroxide/zinc hydroxide mixture is preferably used.

To carry out doping, the cobalt, nickel, copper or zinc compounds are dissolved or dispersed in water or an alcohol, e.g. methanol or ethanol. Water is preferably used as the solvent. The concentration of the cobalt, nickel, copper and zinc compounds can be from 0.02% by weight to saturation limit, preferably from 0.5 to 5% by weight.

After impregnation with the dopants, the carbon carriers for the anode material can be dried in order to promote fixing. The actual fixing is effected using a dilute aqueous alkali metal hydroxide, ammonium hydroxide, ammonium sulfide, an ammonium hydroxide/ammonium sulfide mixture, an alkali metal sulfide or hexamethylenetetramine. Where nitrates are used, precipitation may furthermore be effected by cathodically reducing the nitrate or converting it to ammonia with a reducing agent. Examples of suitable reducing agents for this purpose are hydroquinone and lithium aluminum hydride. Fixing of the dopants with an aqueous alkali metal sulfide has proven the most advantageous method, an aqueous solution containing from 0.2 to 5% by weight of sodium sulfide or potassium sulfide being preferred for this purpose. Highly active anodes may furthermore be obtained if the carbon carriers doped with the salts or hydroxides are used in 3% strength by weight sodium sulfate solution which contains 0.1% by weight of dextrose and 0.1% by weight of urea and is inoculated with adapted sulfate-reducing microorganisms of the Desulfovibrio desulfuricans type. The residence time in this medium should be a few days, preferably from 3 to 10 days.

A porous polyelectrolyte was used to separate the anode from the cathode. Suitable polyelectrolytes are inorganic anion exchangers and cation exchangers, e.g. titanium oxide hydroxide, zirconium oxide hydroxide, kaolinite, montmorillonite, apatite, synthetic hydroxylapatite, magnesium oxide hydroxide, aluminum oxide hydroxide, and aluminum zirconium oxide hydroxide, and inorganic anion exchangers and cation exchangers, e.g. polymers or copolymers of styrene, styrene and divinylbenzene, styrene and maleic anhydride, acrylates and divinylbenzene, methacrylates and divinylbenzene, olefins, perfluorinated olefins, and vinyl chloride and aldehydes, resorcinol and aldehydes, and anisole and aldehydes, which contain, as charge-carrying groups, sulfo and/or carboxyl and/or quaternary ammonium and/or primary, secondary or tertiary amino groups.

Synthetic hydroxylapatite, zirconium aluminum oxide hydroxide, zirconium oxide hydroxide, titanium oxide hydroxide and macroporous exchangers consisting of styrene and divinylbenzene or copolymers based on vinyl chloride which contain primary, secondary or tertiary amino groups or sulfo groups as charge-carrying groups are preferred.

The polyelectrolytes are used in the fuel cell, preferably in the form of granules, as a bed for separating the anode and the cathode. To avoid blockages, the particle size should preferably be from 2 to 6 mm. In the case of waste waters which do not contain any suspended solid particles, the particle size may be smaller. In this case, porous open-cell polyelectrolytes in sponge form can also be used. Moreover, some of the polyelectrolytes may be replaced with sand, dolomite, limestone, peat or clay-containing or sand-containing earth.

However, the bed between the anode and the cathode should contain no less than 20 vol. % of polyelectrolyte.

For industrial operation, graphites having an open porosity of $>12\%$ and $<28\%$ are used as cathode materials. The fuel cell can be provided with tubular or plate-like electrode materials. In special cases, it is also possible to employ beds of granules. The oxidizing agent, e.g. oxygen, is forced through the porous graphite cathodes toward the waste water side.

FIG. 1 shows a fuel cell for the oxidation of waste water, which comprises a porous tubular oxygen reduction electrode 1 made of graphite, and an impermeable tubular graphite anode 2. The two electrodes 1 and 2 are separated by a bed of macroporous polyelectrolyte granules 3. During operation of the cell, oxygen is forced from the inside of the cathode through the latter to the waste water side, while the waste water 4 flows through the porous polyelectrolyte. The oxygen feed is such that the amount of oxygen forced through the cathode is about 5–10% more than the amount of oxygen consumed by the oxidation of the harmful substances.

Figure 2:
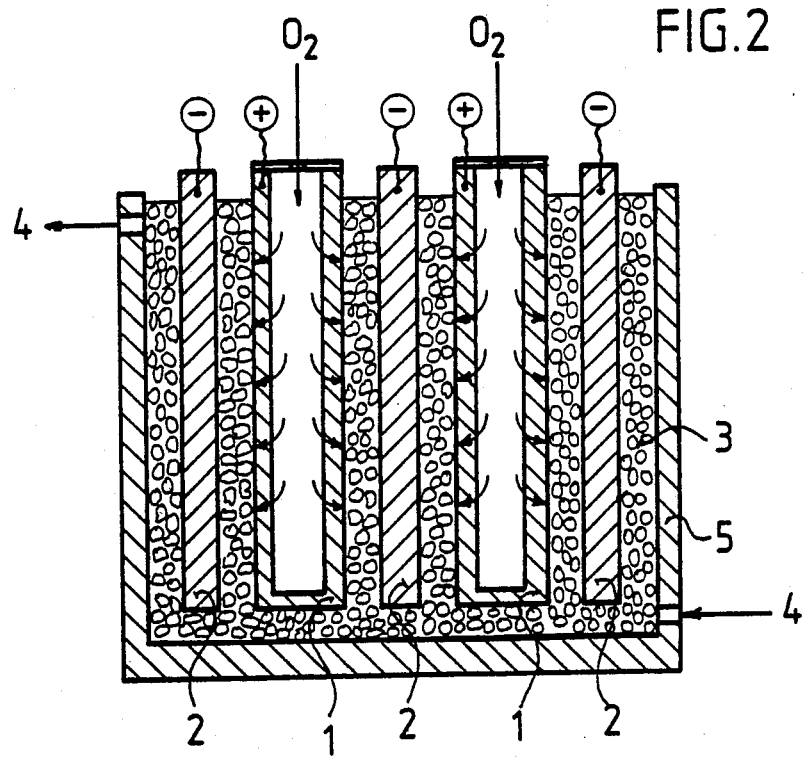

FIG. 2 shows a fuel cell in which the tubular oxygen reduction cathode 1 and the oxidation anode 2, each of which may be of any form, dip into a trough 5 made of porous polyelectrolyte material 3 which is permeable to water. The oxygen feed for the fuel cell in FIG. 2 is similar to that in FIG. 1, while the waste water 4 flows through the trough 5 containing the porous polyelectrolyte 3. The advantages of such arrangements are that the conductivity of the waste water is not critical owing to the presence of the polyelectrolyte, the fuels are stored by adsorption of the harmful substances (fuels) on the polyelectrolyte, and contamination is avoided as a result of the cathode being flushed with oxygen.

EXAMPLE 1

A fuel cell arrangement having the structure shown in FIG. 1 consists of an oxygen reduction electrode of porous electrographite, an oxidation anode of compacted electrographite. The open porosity of the cathode material is ~16%, while that of the anode material is ~10%. The cathode has an internal diameter of 40 mm, an external diameter of 60 mm and a length of 300 mm, and the anode has an internal diameter of 80 mm, an external diameter of 100 mm and a length of 300 mm. The cathode is activated by the following steps:

Anodic oxidation of the outside of the tubular graphite cathode in 50% strength by weight aqueous nitric acid at room temperature for about 10 minutes. Subsequent impregnation with 5% strength by weight aqueous sodium molybdate solution Followed by drying at +80° C. for about 8 hours Treatment with 5% strength by weight aqueous sodium sulfate solution at pH 1 for about 5 minutes Washing with water and treatment with 0.5% strength aqueous sodium sulfide solution for about 2 minutes Final removal of the residual sulfide by treatment with 0.5% strength by weight aqueous hydrochloric acid.

To activate the anode, the following steps are carried out:

Anodic oxidation in 30% strength by weight aqueous nitric acid at 2 kA/m$^2$ for about 10 minutes Subsequent cathodic reduction in 10% strength by weight aqueous sulfuric acid at 1 kA/m$^2$ for about 30 minutes Followed by impregnation with saturated aqueous nickel sulfate solution Precipitation of the nickel, as nickel hydroxide, onto the graphite surface by treatment with 5% strength by weight aqueous sodium hydroxide solution Aging of the nickel hydroxide at +80° C. for about 2 hours Treatment of the graphite surface with 2% strength by weight aqueous sodium sulfide solution for about 2 minutes.

The polyelectrolyte used is a mixture of granules which has a particle size of from 2 to 4 mm and consists of 55 per cent by volume of a synthetic hydroxylapatite and 45 per cent by volume of a zeolite.

During operation of the fuel cell, oxygen is forced from the inside of the tubular graphite cathode through the porous electrode material, and waste water is passed through the polyelectrolyte granules.

The waste water used is a water which contains about 500 mg/l of TOC in the form of fulvic acids, 120 mg/l of alkali metal sulfide, 60 mg/l of alkali metal sulfite and 0.8 mg/l of chlorohydrocarbons, predominantly chloroform.

With this waste water, the resulting equilibrium potential is ~0.85 V. In batchwise operation, a current of 2 A/dm$^2$ flows initially, but current ceases to flow when the harmful substances have been degraded. When there is no longer any flow of current, the waste water is found to contain 12 mg/l of TOC, <1 mg/l of sulfide, <1 mg/l of sulfite and ~0.1 mg/l of chlorohydrocarbons.

We claim:

1. A fuel cell which has an activated carbon-containing anode and an activated carbon-containing cathode and is adapted to be used for the oxidative treatment of waste waters containing oxygen and oxygen-containing compounds, wherein the cathode has been subjected to a partial anodic oxidation in an aqueous mineral acid at a potential $\epsilon_h$ of from +1.3 to +10 V and then doped with molybdenum(VI) and/or tungsten(VI) and/or vanadium(V) compounds, and the anode has been subjected to partial anodic oxidation in an aqueous mineral acid, cathodically reduced in an aqueous mineral acid and then impregnated with cobalt hydroxide and/or nickel hydroxide and/or copper hydroxide and/or zinc hydroxide, the anode and the cathode being separated by a porous polyelectrolyte through which the waste water flows.

2. A fuel cell as claimed in claim 1, wherein a bed of macroporous ion exchanger granules is used to separate the anode from the cathode.

3. A fuel cell as claimed in claim 1, wherein the porous polyelectrolyte consists of a mixture of an anion exchanger and a cation exchanger.

4. A fuel cell as claimed in claim 1, wherein oxygen and/or air or hydrogen peroxide is or are fed to the cathode as an oxidizing agent.

5. A fuel cell as claimed in claim 1, wherein the anode and the cathode are tubular.

6. A fuel cell as claimed in claim 5 wherein oxygen reduction cathodes and oxidation anodes dip into a trough of porous polyelectrolyte particles.

* * * * *